United States Patent [19]
Shaffer et al.

[11] Patent Number: 6,012,741
[45] Date of Patent: Jan. 11, 2000

[54] CONDUIT CONNECTING ARRANGEMENT AND METHOD

[75] Inventors: Bradley J. Shaffer, Romney; Jay C. Rene, Lafayette, both of Ind.; Jay A. Tschetter, Chanhassen, Minn.

[73] Assignee: Caterpillar Inc., Peoria, Ill.

[21] Appl. No.: 09/057,935

[22] Filed: Apr. 9, 1998

[51] Int. Cl.$^7$ .................................................... F16L 3/04
[52] U.S. Cl. .......................... 285/61; 285/189; 285/420; 29/469
[58] Field of Search ................................. 285/61, 62, 63, 285/64, 24, 27, 189, 205, 420; 248/741; 29/469

[56] References Cited

U.S. PATENT DOCUMENTS

| | | | |
|---|---|---|---|
| 2,081,698 | 5/1937 | Farmer | 285/63 |
| 3,195,561 | 7/1965 | Sovitzky | 285/61 X |
| 4,076,281 | 2/1978 | Davis | 285/64 |
| 4,215,880 | 8/1980 | Trittipoe | 285/61 |
| 4,643,458 | 2/1987 | Ammar | 285/62 |

*Primary Examiner*—Dave W. Arola
*Attorney, Agent, or Firm*—Alan J. Hickman

[57] ABSTRACT

An arrangement and method for connecting a fluid passing conduit to a supporting housing having a conduit receiving bore has a strap assembly disposed about an end portion of the fluid passing conduit and a torque restraining bracket. A plurality of fasteners removably connect spaced end portions of the torque restraining bracket and the strap assembly together and secure the torque restraining bracket to the fluid passing conduit. A fastener connects a middle portion of the restraining bracket to the supporting member and maintains the fluid passing conduit from axial and rotary movement. A sealing member seals between the fluid passing conduit and the supporting member. A pilot ring concentrically pilots the conduit end portion relative to the bore.

19 Claims, 2 Drawing Sheets

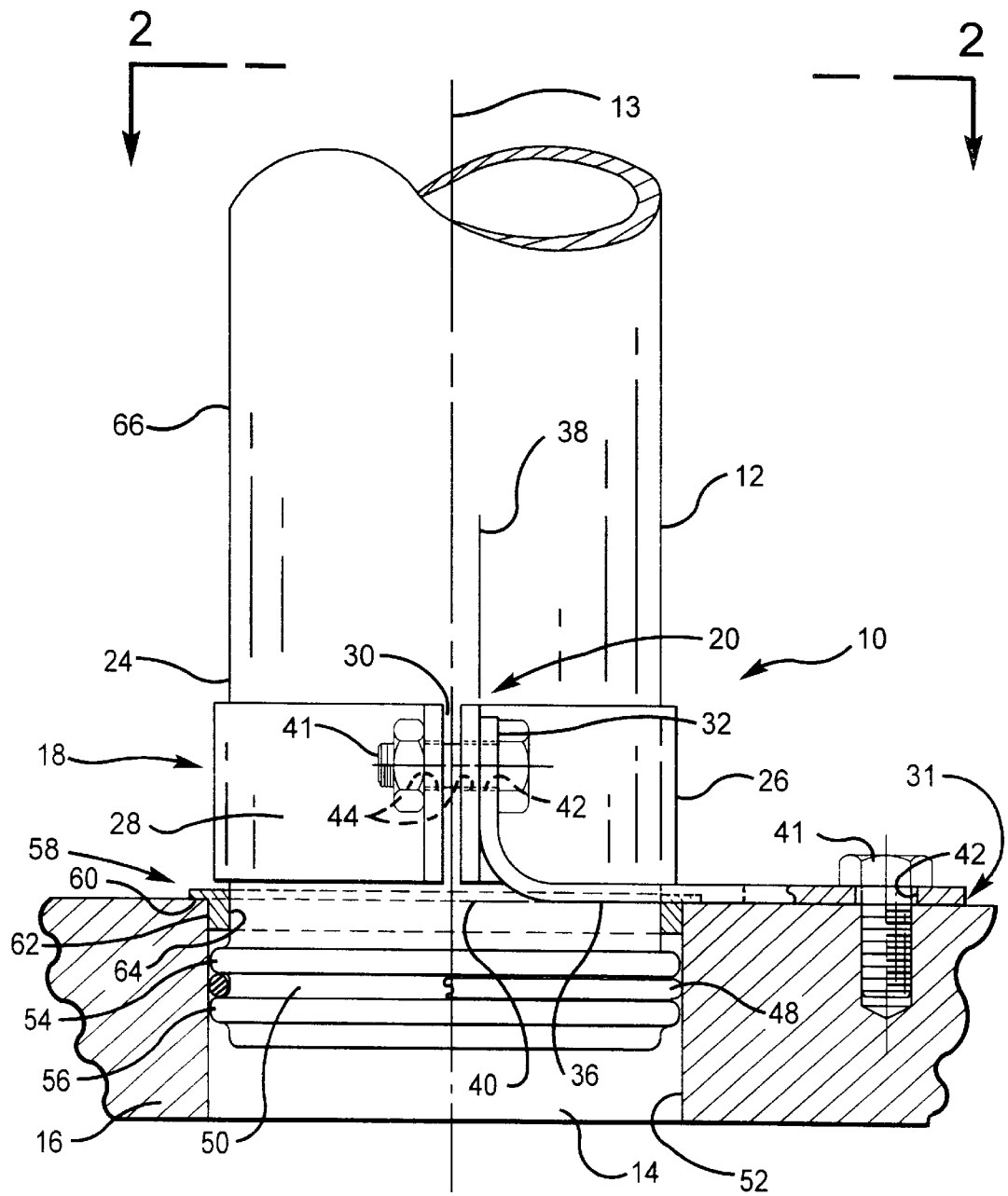
Fig. - 1 -

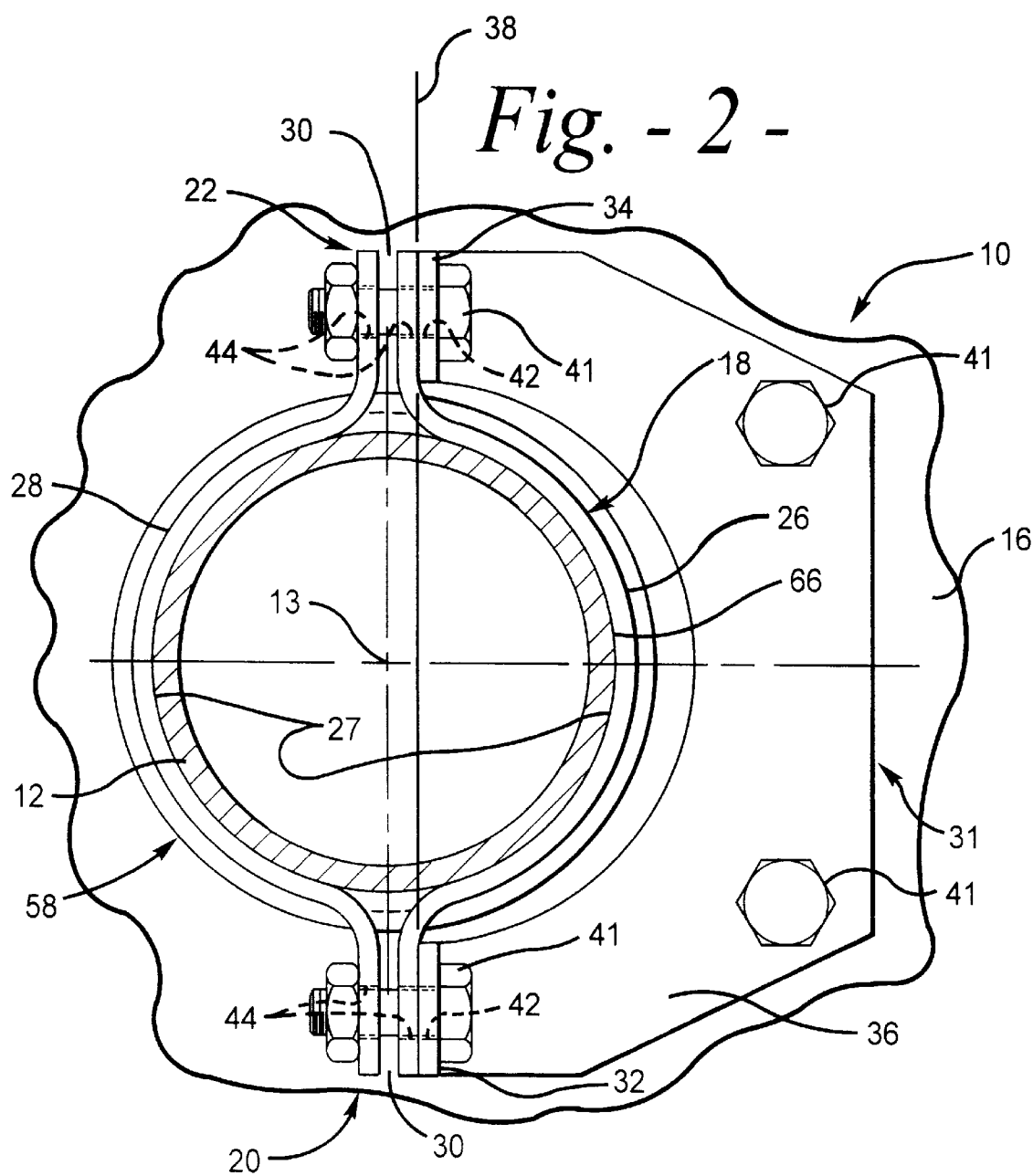

CONDUIT CONNECTING ARRANGEMENT AND METHOD

DESCRIPTION

1. Technical Field

This invention relates to an arrangement and method for connecting a conduit to a supporting member and more particularly to a connecting arrangement and method for maintaining a fluid passing conduit from rotary and axial movement relative to a fluid passing bore disposed in the supporting member.

2. Background Art

In internal combustion engines, construction, mining, earth moving, material handling machines, and other heavy duty machine applications, rigid fluid passing conduits are provided to transfer fluid between machine or engine locations. These fluid passing conduits are robust in construction as they are subjected to heavy loads. In some applications, the load forces are sufficient to cause displacement of the fluid passing conduit (rotation or axial movement) relative to a supporting member to which the conduit is connected. This displacement ultimately results in fluid leakage and often requires that the engine, machine and the like be shut down for repair.

In some applications, an end portion of the fluid passing conduit is disposed in a fluid passing bore of a supporting member and sealed by an "O" ring. The fluid passing conduit is sometimes engaged and retained in the bore by flanges referred to as "crows feet". These flanges are provided to prevent axial movement but are inadequate to restrain the fluid passing conduit from rotation, cocking and the like relative to the supporting member.

In some applications the "O" ring is disposed in the bore and seals between the fluid passing conduit disposed in the bore and the surface defining the bore. Heavy loads applied to the fluid passing conduit may cause crushing movement of the "O" ring resulting in a permanent set of the "O" ring. This permanent set reduces sealing and results in fluid leakage. This problem has been partially addressed by providing a non-metallic pilot ring about the tube which is engagable with the bore surface. This pilot ring centers the tubing and assists in reducing the potential for the "O" ring deforming and the tube cocking.

Often the fluid passing conduit is connected to a flange by brazing, welding and the like. In such applications, the flange is connected to the supporting member by a plurality of bolts. A gasket or other seal is provided between the flange and supporting member. This configuration provides for acceptable axial and radial fluid passing conduit restraint but requires a substantial amount of mounting space. Bolt clearance with the fluid passing conduit is a parameter considered in determining size and the mounting space required. Often the mounting space is limited and prevents use of a such a configuration.

It has been known to provide a clamp having two strap segments to be disposed about a fluid passing conduit and clamped to the conduit by a pair of bolts. It is also known to have a boss welded on the clamp for purposes of receiving a bolt therethrough for fastening to the supporting member. Because the boss is closely adjacent to the clamp and fluid passing conduit, the strength of connection to the supporting member is limited, the accessibility to the fastener for removal is limited and the accuracy of tube positioning is limited. Further, since the boss is welded to one segment of the strap the materials must be substantially the same. As a result strength and flexibility are limited.

In some applications it is desirable to have the various components associated with connection of the fluid passing conduit to the supporting member made from different materials. For example, one component needs to be stiff enough to insure positive clamping and accuracy of location while another component needs to be somewhat flexible in order to resist fracture. Having dissimilar materials eliminates the potential for joining by welding, brazing and the like.

The present invention is directed at overcoming one or more of the problems set forth above.

DISCLOSURE OF THE INVENTION

In one aspect of the present invention, a connecting arrangement for retaining a fluid passing conduit from movement relative to a fluid passing bore disposed in a supporting member is provided. A strap assembly having first and second spaced end portions is fixedly connected to the fluid passing conduit. The strap assembly is maintained from movement relative to the fluid passing conduit. A torque restraining bracket has first and second end portions and a middle portion located between the first and second end portions of the bracket. The bracket middle portion is oriented transversely relative to the axis of the fluid passing conduit and transversely relative to the bracket first and second end portions. A plurality of fasteners connects the first and second end portions of the bracket to the first and second end portions of the strap assembly, respectively, and the middle portion of the bracket to the supporting member. The bracket maintains the fluid passing conduit from axial and rotational movement relative to said fluid passing bore.

In another aspect of the present invention, a method of connecting a fluid passing conduit to a supporting member comprises the steps of: positioning a strap assembly about an end portion of a fluid passing conduit; loosely connecting the strap assembly to a torque restraining bracket by a plurality of fasteners; positioning the end portion of the fluid passing conduit in a bore disposed in the supporting member; connecting the torque restraining bracket to the supporting member by a fastener; and tightening the fasteners connecting the strap assembly to the torque restraining bracket until the strap assembly is maintained from rotational and axial movement relative to the end portion of the fluid passing conduit.

BRIEF DESCRIPTION OF THE DRAWINGS

FIG. 1 is a diagrammatic view of an embodiment of the present invention showing a connecting arrangement for maintaining a fluid passing conduit from axial and pivotal movement relative to a fluid passing bore in a supporting member, and FIG. 2 is a diagrammatic view taken along lines 2—2 of FIG. 1.

BEST MODE FOR CARRYING OUT THE INVENTION

With reference to the drawings, a connecting arrangement 10 is provided for retaining a fluid passing conduit 12 having a axis 13, of preferably a round tubular steel cross-section, from movement relative to a fluid passing bore 14 disposed in a supporting member 16. Preferably, the connecting arrangement 10, maintains the fluid passing conduit 12 from both axial and pivotal movement relative to the fluid passing bore 14 and the supporting member 16. The supporting member 16 includes any structure from which or to which fluid flow is passed. For example, internal combustion engine structures, machine transmission housings, differential housings, hydraulic valves, fuel system structures, and flanges, just to mention a few.

The connecting arrangement 10 includes a strap assembly 18 having first and second spaced end portions 20,22. The strap assembly 18 is connected to an end portion 24 of the fluid passing conduit 12. The strap assembly 18 is secured in such a manner that the conduit 12 and strap assembly 18 are movable together. As a result, the strap assembly 18 is maintained from movement relative to the fluid passing conduit 12. The strap assembly 18 has first and second segments 26,28 which are disposed about and in contact with the conduit 12. The first and second segments 26,28 are preferably constructed from a steel material capable of maintaining shape and resisting bending at the first and second end portions 20,22. This ensures that a space 30 is maintained at the first and second end portions 20,22 so that adequate clamping force may be applied. The first and second segments 26,28 have a curved middle portion 27 having a radius of curvature equal to the radius of curvature of the fluid passing conduit outer surface 66. Such a configuration maximizes the clamping forces between the conduit 12 and strap assembly 18. It is to be noted that the first and second segments 26,28 may be constructed of different materials in order to provide other assembly characteristics. For example, the second segment 28 may be made of a softer metallic material than the first segment 26 in order to conform to the shape of the fluid passing conduit 12. However, it is important to maintain the first segment 26 stiff enough in order to be able to control the location of the first and second end portions 20,22 for alignment purposes with a torque restraining bracket 31, hereinafter described, and to satisfactorily grip the fluid passing conduit so that relative movement between the conduit 12 and the strap assembly 18 is prevented.

A torque restraining bracket 31 has first and second spaced end portions 32,34 and a middle portion 36 located between the first and second end portions 32,34. The first and second end portions 32,34 are oriented to lie in a first plane 38 and the middle portion is 36 is oriented to lie in a second plane 40. As shown, the first plane 38 and the first and second end portions 32,34 are oriented parallel to the axis 13, and the second plane 40, and the middle portion 36 is oriented to be transverse relative to the second plane 40. It should be noted that the first and second planes 38,40 and the associated first and second end portions 32,34 and middle 36 portions are preferably substantially perpendicular. However, it is to be recognized that some deviation is permitted without departing from the spirit of the invention.

A plurality of fasteners 41 of any suitable type, for example, bolts, studs, and nuts, rivets and the like are provided for connecting the first and second end portions 32,34 of the bracket 31 to the first and second end portions 20,22, respectively, of the strap assembly 18, respectively, and the middle portion 36 of the bracket 31 to the supporting member 16. The bracket 31, by virtue of these connections, maintains the fluid passing conduit 12 from axial and rotational movement relative to the fluid passing bore 14 and the supporting member 16 and maintains the fluid passing conduit 12 at the proper orientation relative to the bore 14.

The first and second end portions 32,34 and the middle portion 36 of the bracket 31 each have an aperture 42 disposed therein. Similarly, an aperture 44 is disposed in each of the first and second segments at the first and second end portions 20,22 of the strap assembly 18. Apertures 44 are spaced for alignment with the apertures 42 in the first and second end portions 32,34 of the bracket 31.

A pair of the fasteners 41 is removably disposed in the apertures 42 of the first and second end portions of the strap assembly 18 and urges the first and second segments 26,28 into clamping engagement with the fluid passing conduit 12. It is to be noted that a space 30 is provided to insure that an adequate clamping force is applied. These fasteners 41 are also disposed in the apertures 42 and connect the first and second end portions 20,22 of the strap assembly 18 to the first and second end portions 32,34 of the bracket 31.

Another of the fasteners 41 is removably disposed in the aperture 42 in the middle portion 36 and connects the middle portion 36 of the bracket 31 to the supporting member 16. It is to be understood that one or more additional fasteners 41 and associated apertures 42 may be provided in the middle portion 36 of the bracket 31 in order to provide additional strength and resistance to forces tending to move the bracket 31.

The configuration of the connecting arrangement 10, as heretofore described, may also be constructed to reduce galvanic action (corrosion). This is achieved by making a selective one or more of the components of the connecting arrangement of an electrically non-conductive material. Since connection of strap assembly 18 to the torque restraining bracket 31 may be achieved without welding, brazing or the like, a non-conductive material may be used. As a result, the conducting of stray electrical currents between the fluid passing conduit 12 and the supporting member 16 causing corrosion may be prevented. For example, the strap assembly 18 and/or the torque restraining bracket 31 may be made from an electrically non-conductive material.

The fluid passing conduit has an end portion 24 disposed in the fluid passing bore and a sealing member 48 connected to the fluid passing conduit 12 and in sealing engagement with the supporting member 16. Preferably, the end portion 24 of the fluid passing conduit 12 is cylindrical, round, and has an annular groove 50 disposed circumferentially about the second end portion 24. The sealing member 48 is disposed in the annular groove. Preferably, the sealing member 48 50 is a non-metallic "O" ring and disposed in forcible engagement with the annular groove 50 and a cylindrical surface 52 of the bore 14. It is to be recognized that sealing members 48, such as gaskets, lip type seals, packing and the like, although not preferred, are suitable substitutes and within the spirit of the invention.

The torque restraining bracket 31 maintains the fluid passing conduit 12 substantially concentric with the bore 14 disposed in the supporting member 16 and prevents cocking and axial misalignment of the conduit 12 relative to the bore 14. Thus, the sealing member 48 is maintained properly positioned in the bore 14 and from uneven side loading. As a result, seal crushing and uneven deformation is prevented.

First and second axially spaced annular rings 54,56 are disposed about the fluid passing conduit 12 and define the annular groove 50 therebetween. The first and second annular rings 54,56 and the annular groove 50 disposed therebetween may be provided for in any manner on the end portion 24 of the fluid passing conduit 12. In applications where the conduit 12 is tubular, cylindrical and round it is appropriate to provide such a configuration by way of a double upsetting manufacturing process. By way of this process the first and second spaced apart annular rings 54,56 and the annular groove therebetween are made by upsetting (deformation) of the end portion 24 of the fluid passing conduit 12. In fluid passing conduits 12 that are tubular, cylindrical and round or other selected shapes it is appropriate to secure the first and second annular rings 54,56 to the conduit 12 by any suitable process such as welding and brazing. It is also permissible to machine the first and second annular rings 56 and/or groove 50 in the fluid passing conduit 12.

Each of the heretofore mentioned techniques for providing the annular rings 54,56 and groove 50 are well known in the art and will therefore not be discussed in any greater detail.

In certain embodiments, a pilot ring 58, of a non-metallic material has a flange 60, a pilot portion 62, and a bore 64 disposed therein. The pilot ring 58 is disposed about the fluid passing conduit 12. The pilot ring 58 is axially located along and circumferentially slidably disposed about the outer surface 66 of the end portion 24 of the fluid passing conduit 12 between the strap assembly 18 and the first annular ring 54. The strap assembly 18 is engagable with the pilot ring 58 in response to movement of the pilot ring 58 toward the strap assembly 18 and maintains the pilot ring 58 from axial passing movement relative to the strap assembly 18.

The first and second annular rings 54,56 project radially outwardly from the outer surface 66 of the fluid passing conduit 12 a predetermined distance. This predetermined distance is sufficient to define an adequate depth for the annular groove 50 therebetween so that there is a proper amount of forcible engagement between the sealing member 48 and the fluid passing bore 14 so as to provide a fluid tight joint. This distance is also sufficient to provide a stop for the pilot ring 58. In particular, the first annular ring 54 is engagable with the pilot ring 58 in response to movement of the pilot ring 58 in a direction toward the first annular ring 54. As a result, the pilot ring 58 is maintained from axial passing movement relative to the first annular ring 54 in response to movement in a direction toward the first annular ring 54. It is to be noted that such restraint of axial movement of the pilot ring 58 in either axial direction assists in assembly and during attachment of the connecting arrangement 10.

INDUSTRIAL APPLICABILITY

With reference to the drawings and in operation the connecting arrangement 10 by way of the strap assembly 18, the torque restraining bracket 31 and the plurality of fasteners 41 facilitates ease of connection of the fluid passing conduit 12 to the supporting member 16 and ease of disconnection of the fluid passing conduit 12 from the supporting member.

The fluid passing conduit 12 is connected to the supporting member 16 in the following manner. The sealing member is disposed in the annular groove 50 located between the first and second annular rings 54,56. The pilot ring 58 is disposed about the end portion 24 of the fluid passing conduit 12. The pilot ring 58 pilot portion 62 is disposed in piloting engagement with the bore 14 and with the flange 60 in engagement with the supporting member 16. The pilot ring 58 concentrically pilots (maintains) the end portion 24 at that location relative to the bore 14. The strap assembly 18 is disposed about the end portion 24 of the conduit 12 and the torque restraining bracket 31 and the strap assembly 18 are loosely connected together by fasteners 41. The end portion 24 of the fluid passing conduit 12 is disposed in the bore 14 with the sealing member 48 engaged with the bore 14 surface. The torque restraining bracket 31 is connected to the supporting member 16 by fastener 41, and the strap assembly 18 is securely connected to and about the fluid passing conduit by way of the fasteners 41. It is to be noted that the steps of assembly may vary in sequence without departing from the spirit of the invention.

The connecting arrangement 10 maintains the end portion 24 of the fluid passing conduit 12 substantially concentric with in the bore 14 of the supporting member 16 by way of the torque restraining bracket and prevents side loading of the sealing member 48 so that a substantially leak proof connection is provided.

The connecting arrangement 10 by way of the strap assembly 18 and the torque restraining bracket 31 maintains the fluid passing conduit from axial and rotational movement relative to the bore 14 and reduces the potential for fluid passing leakage between the bore 14 and the fluid passing conduit 12 as fluid flow is passed between the supporting member 16 and the fluid passing conduit 12.

The strap assembly 18 being made of different steel materials insures that adequate clamping about the fluid passing conduit 12 is insured and relative rotation is prevented.

Other aspects, objects and advantages of the instant invention may be obtained from a study of the drawings, the disclosure, and the appended claims.

We claim:

1. A connecting arrangement for retaining a fluid passing conduit having an axis from movement relative to a fluid passing bore disposed in a supporting member, comprising:
   a strap assembly having first and second spaced end portions and being fixedly connected to said fluid passing conduit, said strap assembly being maintained from movement relative to the fluid passing conduit;
   a torque restraining bracket having first and second end portions and a middle portion located between said first and second end portions of said bracket, said bracket middle portion being oriented transversely relative to the axis of said fluid passing conduit and transversely relative to said bracket first and second end portions; and
   a plurality of fasteners connecting the first and second end portions of the bracket to the first and second end portions of the strap assembly, respectively, and the middle portion of the bracket to the supporting member, said strap assembly, torque restraining bracket and said plurality of fasteners maintaining the fluid passing conduit from axial and rotational movement relative to said fluid passing bore.

2. A connecting arrangement, as set forth in claim 1, wherein said strap assembly having first and second segments and being disposed about the fluid passing conduit.

3. A connecting arrangement, as set forth in claim 2, wherein said fasteners at the first and second end portions of the strap assembly urging the first and second segments into clamping engagement with said fluid passing conduit.

4. A connecting arrangement, as set forth in claim 3, wherein said fluid passing conduit having an end portion disposed in the fluid passing bore and including a sealing member connected to the fluid passing conduit and in sealing engagement with the supporting member.

5. A connecting arrangement, as set forth in claim 4, wherein said end portion of the fluid passing conduit being cylindrical and having an annular groove disposed circumferentially about the second end portion, said sealing member being disposed in the annular groove.

6. A connecting arrangement, as set forth in claim 5, wherein said sealing member being a non-metallic "O" ring, said bore being defined by a cylindrical surface, and said sealing member being forcibly engaged with the cylindrical surface.

7. A connecting arrangement, as set forth in claim 4, wherein said first and second end portions of the strap assembly each have an aperture disposed therethrough, the first and second end portions of the bracket each have an aperture disposed therethrough, and the middle portion of the bracket having an aperture disposed therethrough, said plurality of fasteners being threaded and disposed in the apertures.

8. A connecting arrangement, as set forth in claim 4, wherein said bracket middle portion being oriented substantially normal relative to the axis of said fluid passing conduit and substantially normal relative to the bracket first and second end portions.

9. A connecting arrangement, as set forth in claim 5, including a pilot ring having a flange and being disposed about the fluid passing conduit, said pilot ring being axially located along said fluid passing conduit between said strap assembly and said annular groove, said pilot ring being disposed in the bore, said flange being engagable with a surface of the supporting member, said strap assembly being engagable with said pilot ring in response of movement of said pilot ring toward said strap assembly, and said strap assembly maintaining the pilot ring from relative axial passing movement.

10. A connecting arrangement, as set forth in claim 9, including first and second axially spaced annular rings disposed about the fluid passing conduit, said annular rings defining the annular groove therebetween, said first annular ring being engagable with said pilot ring in response to movement of said pilot ring in a direction toward the first annular ring, said first annular ring maintaining the pilot ring from relative axial passing movement.

11. A connecting arrangement, as set forth in claim 10, wherein said first and second annular rings being formed by upsetting the fluid passing conduit.

12. A connecting arrangement, as set forth in claim 4, wherein at least one of the first and second segments and the torque restraining bracket being formed of a different metallic material than the other of said first and second segments and said bracket.

13. A connecting arrangement, as set forth in claim 4, wherein one of said strap assembly and said torque restraining bracket being made of an electrically non-conductive material.

14. A connecting arrangement, as set forth in claim 7, wherein the first and second segments have a curved middle portion, said curved middle portion having a radius of curvature equal to a radius of curvature of the fluid passing conduit.

15. A connecting arrangement, as set forth in claim 4, wherein said torque restraining bracket maintaining said fluid passing conduit substantially concentric relative to the bore.

16. A connecting arrangement, as set forth in claim 15, wherein said plurality of fasteners being removable.

17. A method of connecting a fluid passing conduit to a supporting member, comprising the steps of:

positioning a strap assembly about an end portion of a fluid passing conduit;

loosely connecting the strap assembly to a torque restraining bracket by a plurality of fasteners;

positioning the end portion of the fluid passing conduit in a bore disposed in the supporting member;

connecting the torque restraining bracket to the supporting member by a fastener and maintaining said torque restraining bracket from movement relative to said supporting member; and tightening the fasteners connecting the strap assembly to the torque restraining bracket until the strap assembly is retained from rotational and axial movement relative to the end portion of the fluid passing conduit.

18. A method, as set forth in claim 17, comprising the step of placing a sealing member in an annular groove disposed about the end portion of the fluid passing conduit.

19. A method, as set forth in claim 18, including the step of positioning a pilot ring about the end portion of the fluid passing conduit, said pilot ring being located between the strap assembly and a first annular ring disposed circumferentially about the end portion of the fluid passing conduit.

* * * * *